(12) United States Patent  
Lee

(10) Patent No.: US 8,254,139 B2  
(45) Date of Patent: Aug. 28, 2012

(54) COMMUNICATION DEVICE AND MOTHERBOARD THEREOF

(75) Inventor: Chi Hen Lee, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 397 days.

(21) Appl. No.: 12/711,952

(22) Filed: Feb. 24, 2010

(65) Prior Publication Data

US 2011/0085308 A1    Apr. 14, 2011

(30) Foreign Application Priority Data

Oct. 14, 2009    (TW) .............................. 98134767 A

(51) Int. Cl.
*H05K 5/00* (2006.01)
(52) U.S. Cl. ...................................................... 361/753
(58) Field of Classification Search .................. 361/600, 361/679.02, 690, 704, 715, 753, 757, 800, 361/816, 818; 174/255, 262
See application file for complete search history.

(56) References Cited

FOREIGN PATENT DOCUMENTS

TW    M315412    7/2007

*Primary Examiner* — Jeremy C. Norris
*Assistant Examiner* — Tremesha S Willis
(74) *Attorney, Agent, or Firm* — Foley & Lardner LLP

(57) ABSTRACT

A motherboard of a communication device includes a base-board, an antenna, a wireless communication module, a first connecting component, a second connecting component, and a main microstrip line. The base board includes a circuit area provided with the wireless communication module and the first connecting component, an antenna area provided with the antenna, and a protecting area disposed between the circuit area and the antenna area to separate the circuit area and the antenna area from each other. The antenna includes a feed-in end for signal feed-in. The second connecting component is disposed at the wireless communication module, and is separably connected to the first connecting component. The main microstrip line is disposed on the base board, and electrically connects the first connecting component and the feed-in end. The main microstrip line is electrically connected to the wireless communication module through the first and second connecting components.

20 Claims, 4 Drawing Sheets

COMMUNICATION DEVICE AND MOTHERBOARD THEREOF

CROSS-REFERENCE TO RELATED APPLICATION

This application claims priority of Taiwanese Application No. 098134767, filed on Oct. 14, 2009.

BACKGROUND OF THE INVENTION

1. Field of the Invention

The present invention relates to a communication device, more particularly to a communication device capable of transmitting a radio-frequency signal.

2. Description of the Related Art

Since a wireless internet access function is currently a commonly used computer function, a built-in wireless internet access module and a built-in antenna have become a common specification for a notebook computer. Hence, how to obtain an optimum balance among manufacturing cost, size, and capability of wireless transmission is a subject every manufacturer devotes efforts for research.

Referring to FIG. 1, in a conventional notebook computer 90, an antenna 91 is generally disposed at a top edge of a screen 94, and is electrically connected to a wireless communication module 93 disposed on a motherboard through a transmission cable 92. In order to securely assemble the transmission cable 92 in a housing of the notebook computer 90, aside from allotting space for accommodating the transmission cable 92 in the crowded housing, it is also required to design a path that allows the transmission cable 92 to extend around a display panel, interface terminals, and many other electronic components of the notebook computer 90. Moreover, it is needed to provide structures in the housing for fixing the transmission cable 92. Consequently, the cost of assembling the transmission cable 92 to electrically connect the antenna 91 and the wireless communication module 93 not only involves the cost of the transmission cable 92 itself, but also other expenses attributed to use of the transmission cable 92.

SUMMARY OF THE INVENTION

Therefore, an object of the present invention is to provide a communication device that does not require use of a transmission cable for signal transmission between an antenna and a wireless communication module.

Accordingly, a communication device of the present invention comprises a housing, and a motherboard disposed in the housing. The motherboard includes a base board, and an electronic circuit unit, an antenna, a wireless communication module, a first connecting component, and a main microstrip line that are disposed on the base board. The base board includes a circuit area, an antenna area, and a protecting area that is disposed between the circuit area and the antenna area and that is disposed to separate the circuit area and the antenna area from each other. The electronic circuit unit is disposed at the circuit area. The antenna is disposed at the antenna area, and includes a feed-in end for signal feed-in. The wireless communication module is removably disposed at the circuit area, and is electrically connected to the electronic circuit unit. The first connecting component is disposed at the circuit area. The motherboard further includes a second connecting component disposed at the wireless communication module and separably connected to the first connecting component. The main microstrip line is disposed on the base board, and electrically connects the first connecting component and the feed-in end of the antenna. The main microstrip line is electrically connected to the wireless communication module through the first and second connecting components. Preferably, in order to reduce susceptibility of the antenna to interference, the motherboard further includes a grounded copper foil unit disposed at the protecting area.

Preferably, the first connecting component and the second connecting component are a plug connector and a receptacle connector that are capable of removable engagement with each other.

By using the microstrip line to electrically connect the antenna and the wireless communication module that are disposed on the based board, additional space in the housing of the communication device need not be allotted. In addition, compared with transmission cables, manufacturing and material costs can be reduced since the microstrip line can be provided on the base board when forming a layout of the motherboard.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
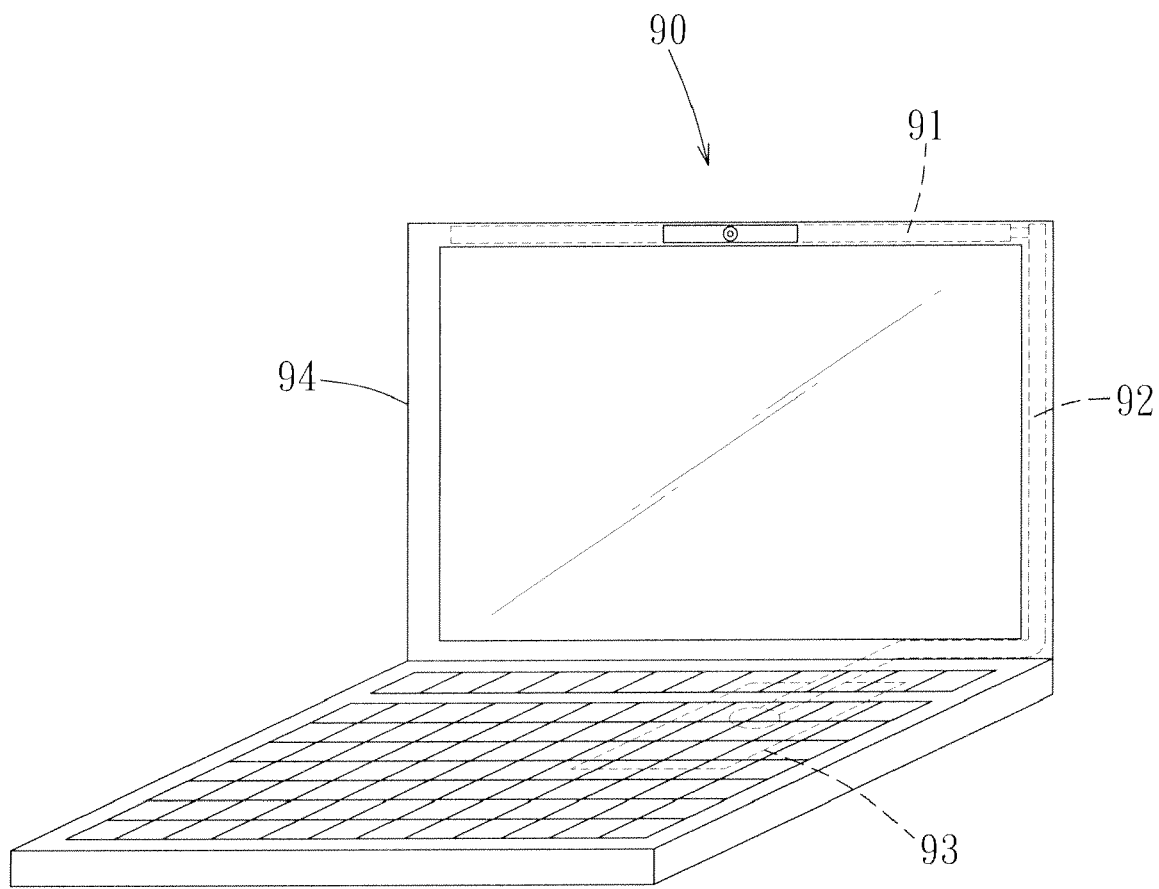
FIG. 1 is a perspective view of a conventional notebook computer for illustrating use of a transmission cable as a signal transmission interface between an antenna and a wireless communication module.

Before the present invention is described in greater detail, it should be noted that like elements are denoted by the same reference numerals throughout the disclosure.

Figure 2:
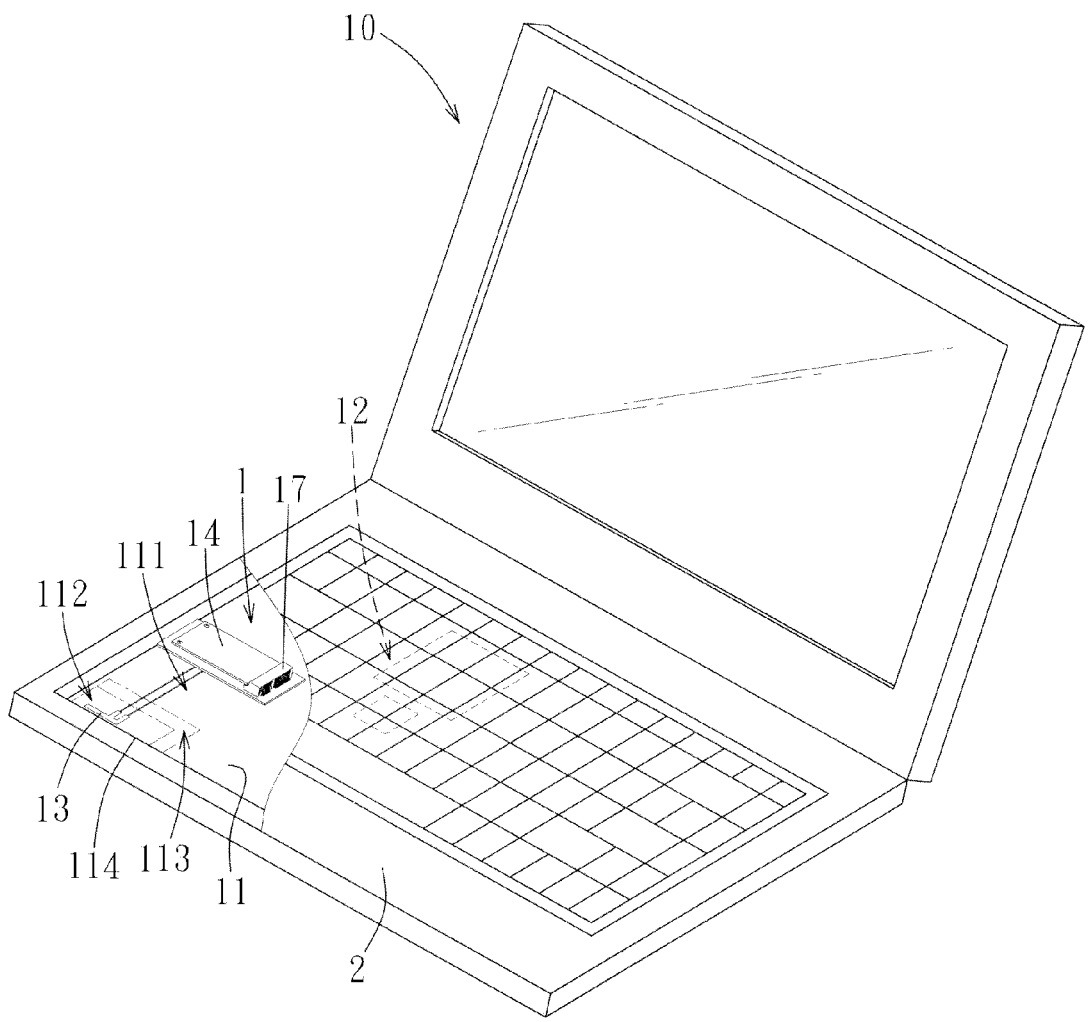
FIG. 2 is a perspective view of a first preferred embodiment of a communication device of the present invention with part of a housing of the communication device being omitted to show a portion of a motherboard.
Figure 3:
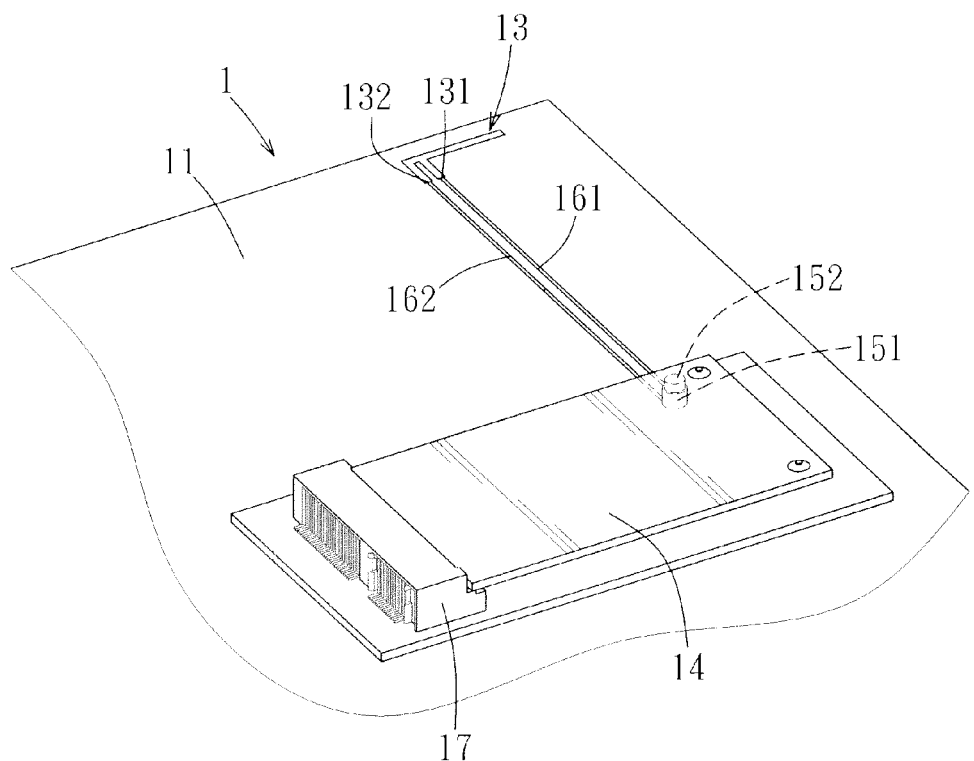
FIG. 3 is a schematic perspective view of the portion of the motherboard of the first preferred embodiment.

Referring to FIGS. 2 and 3, a first preferred embodiment of a communication device 10 of the present invention includes a housing 2, and a motherboard 1 disposed in the housing 2. The motherboard 1 includes a base board 11, and an electronic circuit unit 12, an antenna 13, a wireless communication module 14, a socket 17, a first connecting component 151, a main microstrip line 161 and a grounding microstrip line 162 that are disposed on the base board 11. The motherboard 1 further includes a second connecting component 152. The socket 17 allows the wireless communication module 14 to be inserted therein. The first and second connecting components 151, 152 are separably connected to each other. The main microstrip line 161 and the grounding microstrip line 162 bridge the antenna 13 and the wireless communication module 14. In order to facilitate the following description, the base board 11 is divided into three areas, i.e., a circuit area 111, an antenna area 112 and a protecting area 113. The circuit area 111 is provided with the electronic circuit unit 12 that includes several electronic circuit components, such as a central processing unit, a southbridge chipset and a random-access memory, for various electronic signal processing in the communication device 10. The antenna area 112 has the antenna 13 disposed thereat, and is adjacent to an edge 114 of the base board 11 and a side edge of the housing 2. The protecting area 113 is disposed between the circuit area 111 and the antenna area 112, and is disposed to separate the circuit area 111 and the antenna area 112 from each other. There is no electronic component disposed at the protecting area 113. The purpose of the protecting area 113 is to prevent the antenna 13 at the antenna area 112 from being disturbed by high-frequency interference attributed to the electronic circuit unit 12 at the circuit area 111, which can affect transceiving efficiency of the antenna 13. It should be noted that, in this embodiment, the antenna area 112 for disposition of the antenna 13 is adjacent to the edge 114 of the base board 11, but the location of the antenna area 112 can be adjusted according to different requirements of the transceiving efficiency.

The socket 17 is disposed at the circuit area 111 of the base board 11, and includes a plurality of conductive pins for electrically connecting to the electronic circuit unit 12. The wireless communication module 14 is a wireless network card removably inserted into the socket 17. The wireless network card is a module card including a radio-frequency circuit, an intermediate frequency circuit, a compiler, and an interpreter. The wireless communication module 14 transmits and receives a radio-frequency signal via the antenna 13 so as to enable the communication device 10 to have a wireless communication function.

Figure 4:
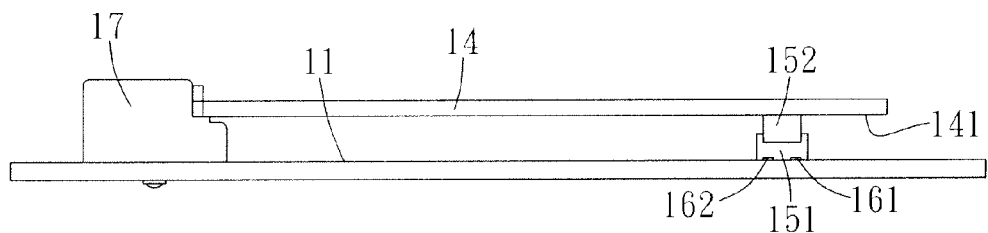
FIG. 4 is a side view of the portion of the motherboard of the first preferred embodiment.

Referring to FIGS. 3 and 4, in this embodiment, the first connecting component 151 is a receptacle connector disposed on the base board 11 under the wireless communication module 14, and is connected to one end of the main microstrip line 161 and one end of the grounding microstrip line 162. The second connecting component 152 is a plug connector disposed on a bottom surface 141 of the wireless communication module 14 that faces the base board 11, and separably engages the first connecting component 151. The first connecting component 151 and the second connecting component 152 not only electrically connect the wireless communication module 14 to the main microstrip line 161 and the grounding microstrip line 162, but also support the wireless communication module 14 so that the wireless communication module 14 is not easily loosened from the socket 17. It should be noted that the wireless communication module 14 is a pluggable module card in this embodiment. During the assembly process of the motherboard 1, one end of the wireless communication module 14 is inserted into the socket 17, and the second connecting component 152 disposed at the wireless communication module 14 is downwardly inserted into the first connecting component 151 disposed on the base board 11. When the wireless communication module 14 requires maintenance or replacement, the second connecting component 152 is upwardly extracted from the first connecting component 151, and the wireless communication module 14 is unplugged from the socket 17 such that the wireless communication module 14 is removed from the motherboard 1.

Figure 5:
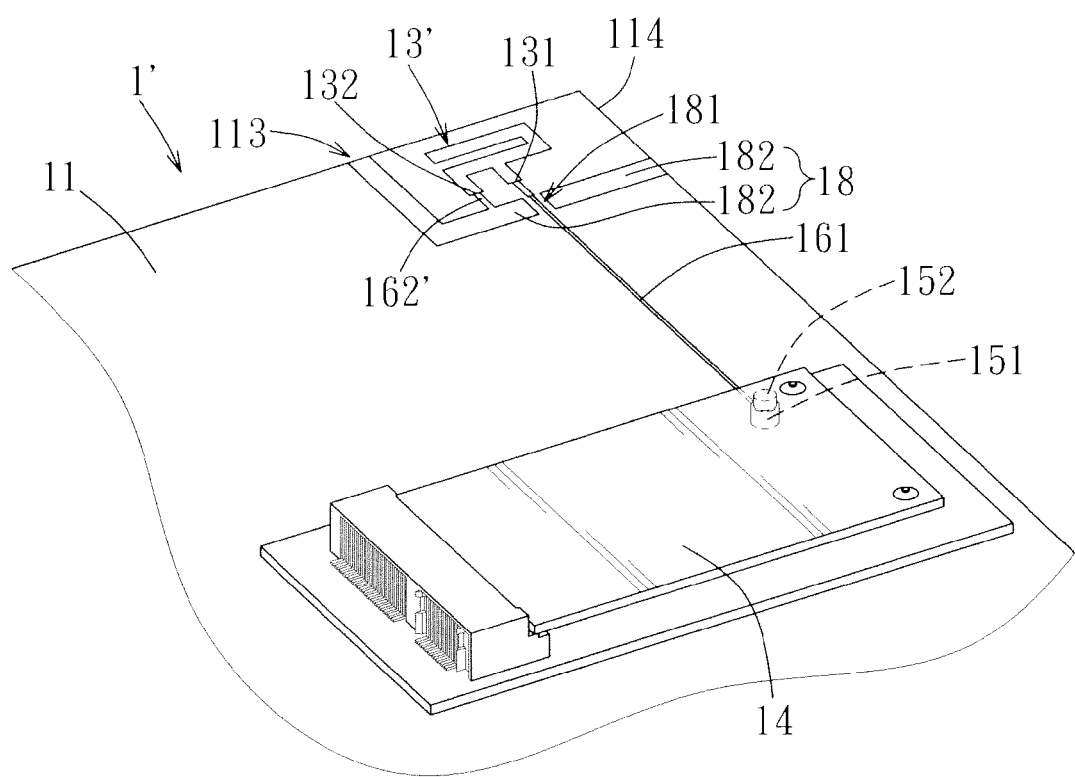
FIG. 5 is a perspective view of a portion of a motherboard of a second preferred embodiment of this invention.

In this embodiment, the antenna 13 is disposed at the antenna area 112, and is adjacent to the side edge of the housing 2. The antenna 13 includes a feed-in end 131 for signal feed-in, and a short-circuit end 132 for electrical grounding. The feed-in end 131 and the short-circuit end 132 are respectively connected to the other end of the main microstrip line 161 and the other end of the grounding microstrip line 162, and are electrically connected to the wireless communication module 14 through the main microstrip line 161, the grounding microstrip line 162, and the first and second connecting components 151, 152. It should be noted that, although the antenna 13 is an F-shaped patch antenna disposed on the base board 11 in this embodiment, a form of the antenna 13 can be in a shape as shown in FIG. 5 in other embodiments. The patch antenna 13 can have other configurations allowing the communication device 10 to transmit and receive radio-frequency signals, and the antenna configurations are not limited to the forms shown in FIGS. 3 and 5. Since such configurations are well known to those skilled in the art, other practicable forms of the antenna 13 will not be described herein for the sake of brevity.

Referring to FIG. 5, a second preferred embodiment of the motherboard 1' of this invention is shown to be similar to the first preferred embodiment. In this embodiment, the protecting area 113 of the base board 11 is provided with a grounded copper foil unit 18 thereon. The copper foil unit 18 separates the antenna 13' from the electronic circuit unit (shown in FIG. 2), and is electrically connected to the short-circuit end 132 of the antenna 13' through the grounding microstrip line 162'. The copper foil unit 18 serves as a guard ring, such that the antenna 13' is relatively undisturbed by the high-frequency interference attributed to the electronic circuit unit when compared with the first preferred embodiment, and such that damage to the wireless communication module 14 caused by electrostatic discharge can be avoided. Preferably, the antenna 13' is disposed at an area surrounded by the copper foil unit 18 and the edge 114 of the base board 11. In this embodiment, the copper foil unit 18 includes a pair of copper foil strips 182 that are spaced apart from each other, and that cooperatively define a slot 181 allowing the main microstrip line 161 to pass therethrough. The feed-in end 131 of the antenna 13' is electrically connected to the wireless communication module 14 through the main microstrip line 161 and the first and second connecting components 151, 152, such that the wireless communication module 14 is capable of transmitting and receiving the radio-frequency signals through the antenna 13'.

In conclusion, the antenna 13, 13' and the wireless communication module 14 on the base board 11 are electrically connected to each other through the microstrip line 161, such that additional space in the housing 2 of the communication device 10 need not be allotted. Moreover, since the main microstrip line 161 and the grounding microstrip line 162, 162' can be provided on the base board 11 when forming a layout of the motherboard 1, 1', the manufacturing and material costs can be reduced compared with use of transmission cables in the prior art.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A communication device comprising a housing, and a motherboard being disposed in said housing, said motherboard including:
   a base board including a circuit area, an antenna area, and a protecting area that is disposed between said circuit area and said antenna area and that is disposed to separate said circuit area and said antenna area from each other;
   an electronic circuit unit being disposed at said circuit area;
   an antenna being disposed at said antenna area and including a feed-in end for signal feed-in;
   a wireless communication module being removably disposed at said circuit area, and being electrically connected to said electronic circuit unit;
   a first connecting component being disposed at said circuit area;

a second connecting component being disposed at said wireless communication module, and being separably connected to said first connecting component; and a main microstrip line being disposed on said base board, and electrically connecting said first connecting component and said feed-in end of said antenna, said main microstrip line being electrically connected to said wireless communication module through said first and second connecting components.

2. The communication device as claimed in claim 1, wherein said motherboard further includes a grounding microstrip line, said antenna further includes a short-circuit end for grounding, and said grounding microstrip line electrically connects said first connecting component and said short-circuit end of said antenna and is electrically connected to said wireless communication module through said first and second connecting components.

3. The communication device as claimed in claim 1, wherein said motherboard further includes a grounded copper foil unit disposed at said protecting area.

4. The communication device as claimed in claim 3, wherein said motherboard further includes a grounding microstrip line disposed on said base board, said antenna further includes a short-circuit end for grounding, and said grounding microstrip line electrically connects said short-circuit end and said copper foil unit.

5. The communication device as claimed in claim 1, wherein said circuit area of said base board is provided with a socket, and said wireless communication module is removably inserted into said socket and is electrically connected to said electronic circuit unit through said socket.

6. The communication device as claimed in claim 1, wherein said first connecting component is one of a plug connector and a receptacle connector, and said second connecting component is the other one of the plug connector and the receptacle connector.

7. The communication device as claimed in claim 1, wherein said base board has an edge, and said antenna area is adjacent to said edge of said base board and is adjacent to said housing.

8. A motherboard, comprising:
    a base board including a circuit area, an antenna area, and a protecting area that is disposed between said circuit area and said antenna area and that is disposed to separate said circuit area and said antenna area from each other;
    an electronic circuit unit being disposed at said circuit area;
    an antenna being disposed at said antenna area and including a feed-in end for signal feed-in;
    a wireless communication module being removably disposed at said circuit area, and being electrically connected to said electronic circuit unit;
    a first connecting component being disposed at said circuit area;
    a second connecting component being disposed at said wireless communication module, and being separably connected to said first connecting component; and
    a main microstrip line being disposed on said base board, and electrically connecting said first connecting component and said feed-in end of said antenna, said main microstrip line being electrically connected to said wireless communication module through said first and second connecting components.

9. The motherboard as claimed in claim 8, further comprising a grounding microstrip line, said antenna further including a short-circuit end for grounding, said grounding microstrip line electrically connecting said first connecting component and said short-circuit end of said antenna and being electrically connected to said wireless communication module through said first and second connecting components.

10. The motherboard as claimed in claim 8, further comprising a grounded copper foil unit disposed at said protecting area.

11. The motherboard as claimed in claim 10, further comprising a grounding microstrip line disposed on said base board, said antenna further including a short-circuit end for grounding, said grounding microstrip line electrically connecting said short-circuit end and said copper foil unit.

12. The motherboard as claimed in claim 8, wherein said circuit area of said base board is provided with a socket, and said wireless communication module is removably inserted into said socket and is electrically connected to said electronic circuit unit through said socket.

13. The motherboard as claimed in claim 8, wherein said first connecting component is one of a plug connector and a receptacle connector, and said second connecting component is the other one of the plug connector and the receptacle connector.

14. The motherboard as claimed in claim 8, wherein said base board has an edge, and said antenna area is adjacent to said edge.

15. A communication device comprising a housing, and a motherboard being disposed in said housing, said motherboard including:
    a base board being provided with a first connecting component and a socket that includes a plurality of conductive pins;
    an electronic circuit unit being disposed on said base board;
    an antenna being disposed on said base board and including a feed-in end for signal feed-in;
    a wireless communication module being disposed on said base board and being removably inserted into said socket, said wireless communication module being electrically connected to said electronic circuit unit through said conductive pins of said socket, and being provided with a second connecting component that is removably connected to said first connecting component; and
    a main microstrip line being disposed on said base board, and electrically connecting said first connecting component and said feed-in end of said antenna.

16. The communication device as claimed in claim 15, wherein said motherboard further includes a grounding microstrip line disposed on said base board, said antenna further includes a short-circuit end for grounding, and said grounding microstrip line electrically connects said first connecting component and said short-circuit end of said antenna on said base board.

17. The communication device as claimed in claim 15, wherein said motherboard further includes a grounded copper foil unit disposed on said base board.

18. The communication device as claimed in claim 17, wherein said motherboard further includes a grounding microstrip line disposed on said base board, said antenna further includes a short-circuit end, and said grounding microstrip line electrically connects said copper foil unit and said short-circuit end of said antenna on said base board.

19. The communication device as claimed in claim 17, wherein said base board has an edge, and said antenna is disposed between said copper foil unit and said edge.

20. The communication device as claimed in claim 19, wherein said copper foil unit is formed with a slot that allows said main microstrip line to pass therethrough.

* * * * *